(12) United States Patent
Jagasia et al.

(10) Patent No.: US 7,934,760 B2
(45) Date of Patent: May 3, 2011

(54) ASSIST GRIP ASSEMBLIES

(75) Inventors: Mohit Anand Jagasia, Rowville (AU);
Kevin Lyle Gilleo, Ann Arbor, MI (US);
Sean Wright, Livonia, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 99 days.

(21) Appl. No.: 12/409,959

(22) Filed: Mar. 24, 2009

(65) Prior Publication Data

US 2010/0244477 A1   Sep. 30, 2010

(51) Int. Cl.
*B60J 9/00* (2006.01)
(52) U.S. Cl. .......................... 296/1.02; 296/71; 296/214
(58) Field of Classification Search .................. 296/1.02, 296/71, 97.9, 187.05, 210, 214
See application file for complete search history.

(56) References Cited

U.S. PATENT DOCUMENTS

| | | | |
|---|---|---|---|
| 5,560,575 A * | 10/1996 | Krysiak | 248/222.12 |
| 6,042,176 A * | 3/2000 | Ikeda et al. | 296/187.05 |
| 6,499,782 B2 * | 12/2002 | Kwon | 296/1.02 |
| 6,869,119 B2 * | 3/2005 | Ito et al. | 296/1.02 |
| 7,029,054 B2 * | 4/2006 | Kobayashi et al. | 296/146.1 |
| 7,121,610 B2 | 10/2006 | Nguyen | |
| 7,407,209 B2 | 8/2008 | Stolarczyk et al. | |
| 7,410,189 B2 * | 8/2008 | Choi | 280/730.2 |
| 2002/0021014 A1 | 2/2002 | Sakuma et al. | |
| 2002/0038958 A1 * | 4/2002 | Miho et al. | 296/71 |
| 2004/0036304 A1 | 2/2004 | Thompson et al. | |
| 2005/0146163 A1 | 7/2005 | Martinez et al. | |
| 2006/0038429 A1 | 2/2006 | Bauer | |
| 2006/0082174 A1 * | 4/2006 | Cowelchuk et al. | 296/1.08 |
| 2007/0267884 A1 | 11/2007 | Failla et al. | |
| 2008/0018127 A1 * | 1/2008 | Schindler et al. | 296/1.02 |
| 2008/0079287 A1 | 4/2008 | Kim | |

* cited by examiner

*Primary Examiner* — Glenn Dayoan
*Assistant Examiner* — Pinel E Romain
(74) *Attorney, Agent, or Firm* — Dinsmore & Shohl LLP

(57) ABSTRACT

Disclosed is an assist grip assembly including a handle portion and at least one support structure, the at least one support structure including a securing surface attached to a mounting area of a vehicle body, and a transfer member comprising a flex portion and a contact portion having a contact surface, wherein the transfer member is formed with or attached to the handle portion and when a load is applied to the handle portion in a first direction, the contact surface of the transfer member contacts a contact area of the vehicle body and transfers at least a portion of the load from the mounting area to the contact area.

19 Claims, 7 Drawing Sheets

ASSIST GRIP ASSEMBLIES

TECHNICAL FIELD

The invention relates to assist grip assemblies, and more particularly, to support structures utilized for providing additional strength and durability to assist grip assemblies mounted on or within a vehicle.

BACKGROUND

Many vehicles contain assist grips to aid passengers in entering or exiting the interior of the vehicle. Passengers repeatedly place a large force on these assist grips in supporting at least a portion of their weight. Accordingly, increasing the strength and durability of the points of attachment between the assist grip assembly and the vehicle body is of continued interest.

SUMMARY

One embodiment of an assist grip assembly includes a handle portion and at least one support structure, the at least one support structure including a securing surface attached to a mounting area of a vehicle body, and a transfer member comprising a flex portion and a contact portion having a contact surface, wherein the transfer member is formed with or attached to the handle portion. When a load is applied to the handle portion in a first direction, the contact surface of the transfer member contacts a contact area of the vehicle body and transfers at least a portion of the load from the mounting area to the contact area.

Another embodiment of an assist grip assembly includes a handle portion and at least one support structure, the at least one support structure including a securing surface attached to a mounting area of a vehicle body, and a transfer member comprising a flex portion and a contact portion having a first contact surface and a second contact surface, wherein the transfer member is formed with or attached to the handle portion and when the contact portion is inserted into an aperture in the vehicle body, the first contact surface faces a first contact area of the vehicle body and the second contact surface faces a second contact area of the vehicle body. When the assist grip assembly is in a first supported position, the first contact surface of the transfer member contacts the first contact area of the vehicle body and transfers at least a portion of a load from the mounting area to the first contact area, and when the assist grip assembly is in a second supported position, the second contact surface of the transfer member contacts the second contact area of the vehicle body and transfers at least a portion of a load from the mounting area to the second contact area.

Another embodiment of an assist grip assembly includes a handle portion and at least one support structure, the at least one support structure including a securing surface attached to a mounting area of a vehicle body, and a transfer member comprising a flex portion and a contact portion having a contact surface, wherein the transfer member is formed with or attached to the handle portion. When no load is applied to the handle portion, the assist grip assembly is in an unsupported position such that the contact surface of the transfer member is free from contact with a contact area of the vehicle body and when a load is applied to the handle portion in a first direction, the assist grip assembly is in a supported position such that the contact surface of the transfer member contacts the contact area of the vehicle body and transfers at least a portion of the load from the mounting area to the contact area.

These and additional features can be more fully understood in view of the following detailed description, in conjunction with the drawings.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
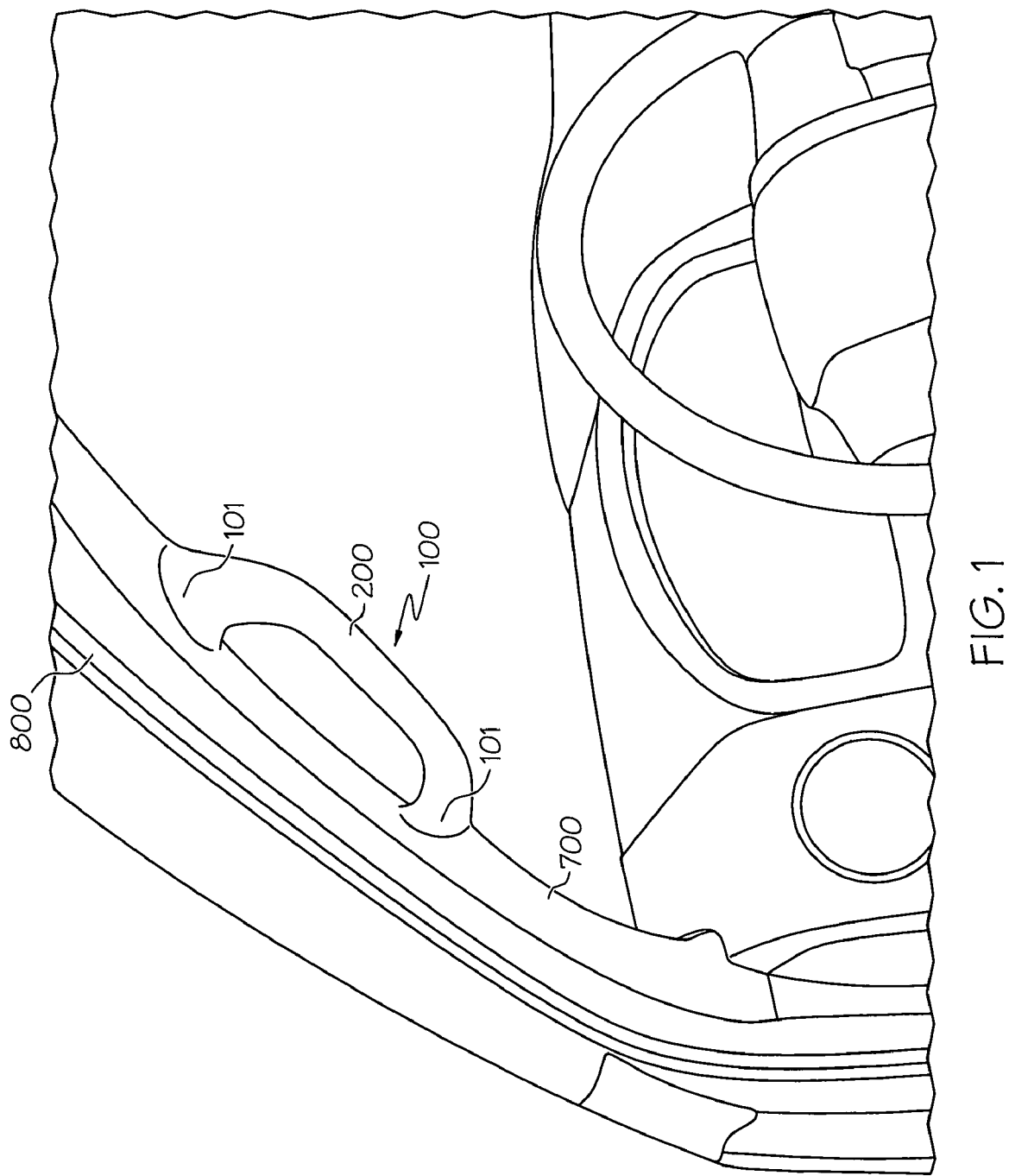
FIG. 1 is a view of an exemplary assist grip assembly situated within an interior of a vehicle.

As will be discussed in relation to the figures, embodiments of an assist grip assembly 100 may include a handle portion 200 and at least one support structure 300,400. Handle portion 200 may further include a spine 210, a primary overlay 230 and a secondary overlay 250. Support structure 300,400 may further include a securing surface 310,410 and a transfer member 330,430. It should be understood, however, that embodiments of assist grip assembly 100 may also include additional elements, such as fasteners 600 and trim parts.

Assist grip assemblies 100 may be disposed on or within a vehicle at a variety of locations, and in particular, may be disposed within an interior of a vehicle adjacent an exit, such as a door. Referring to the embodiment of FIG. 1, assist grip assembly 100 may be positioned along the interior side of a door jam post that spans the length between the dashboard and the roof of a vehicle. However, assist grip assemblies may also be disposed at other locations on the vehicle, such as on the headliner/roof, the floor, the dashboard, the doors, the seats, other locations along the door jam post, and/or locations on the exterior of the vehicle. In addition, although FIG. 1 depicts the application of an assist grip assembly employed within an automobile, assist grip assemblies may also be utilized on or within other vehicles including, but not limited to, trucks, trains, trams, busses, boats and golf carts. Accordingly, assist grip assembly 100 should not be limited to automobile applications.

Figure 2:
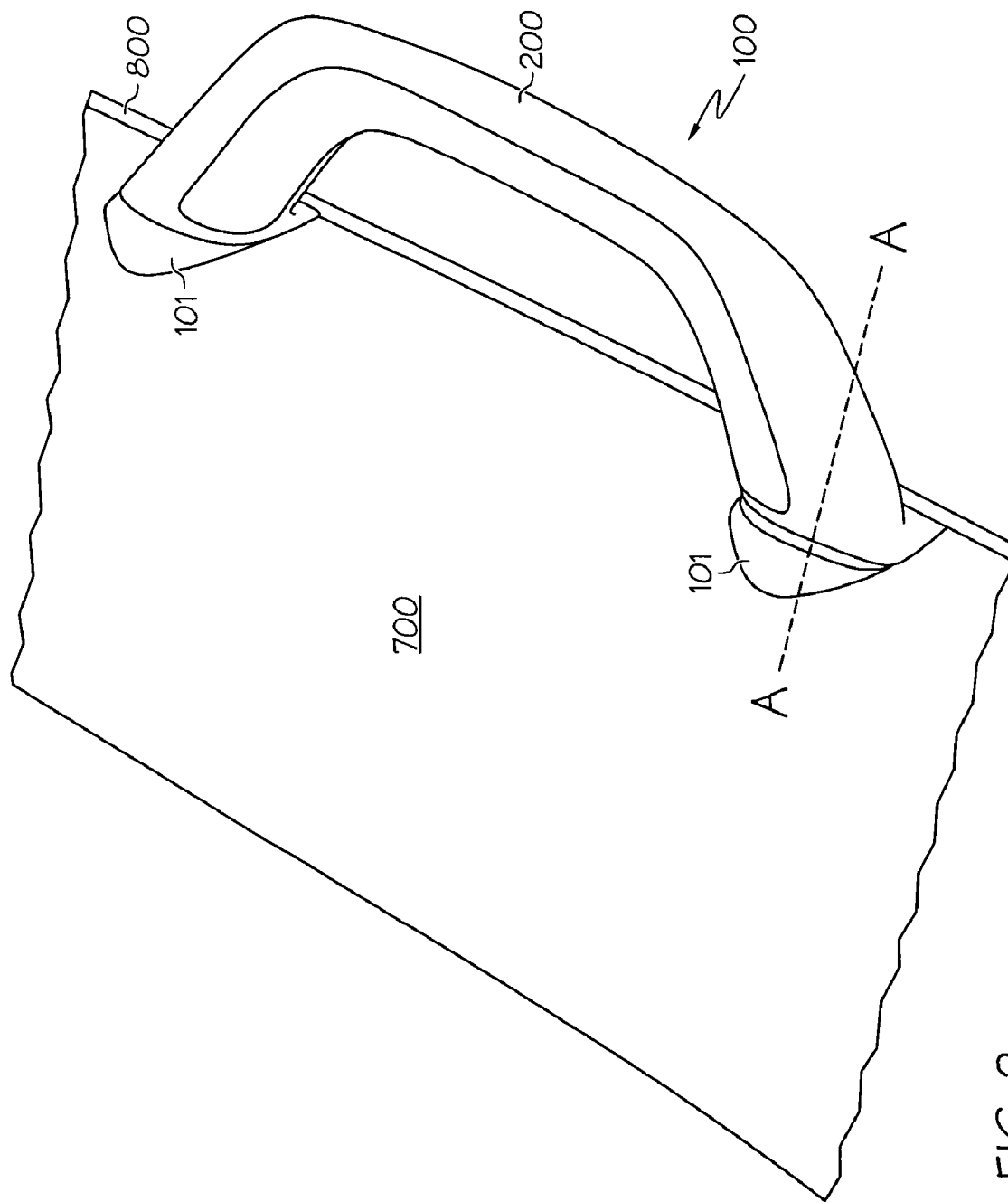
FIG. 2 is a perspective view of the assist grip assembly of FIG. 1.
Figure 3:
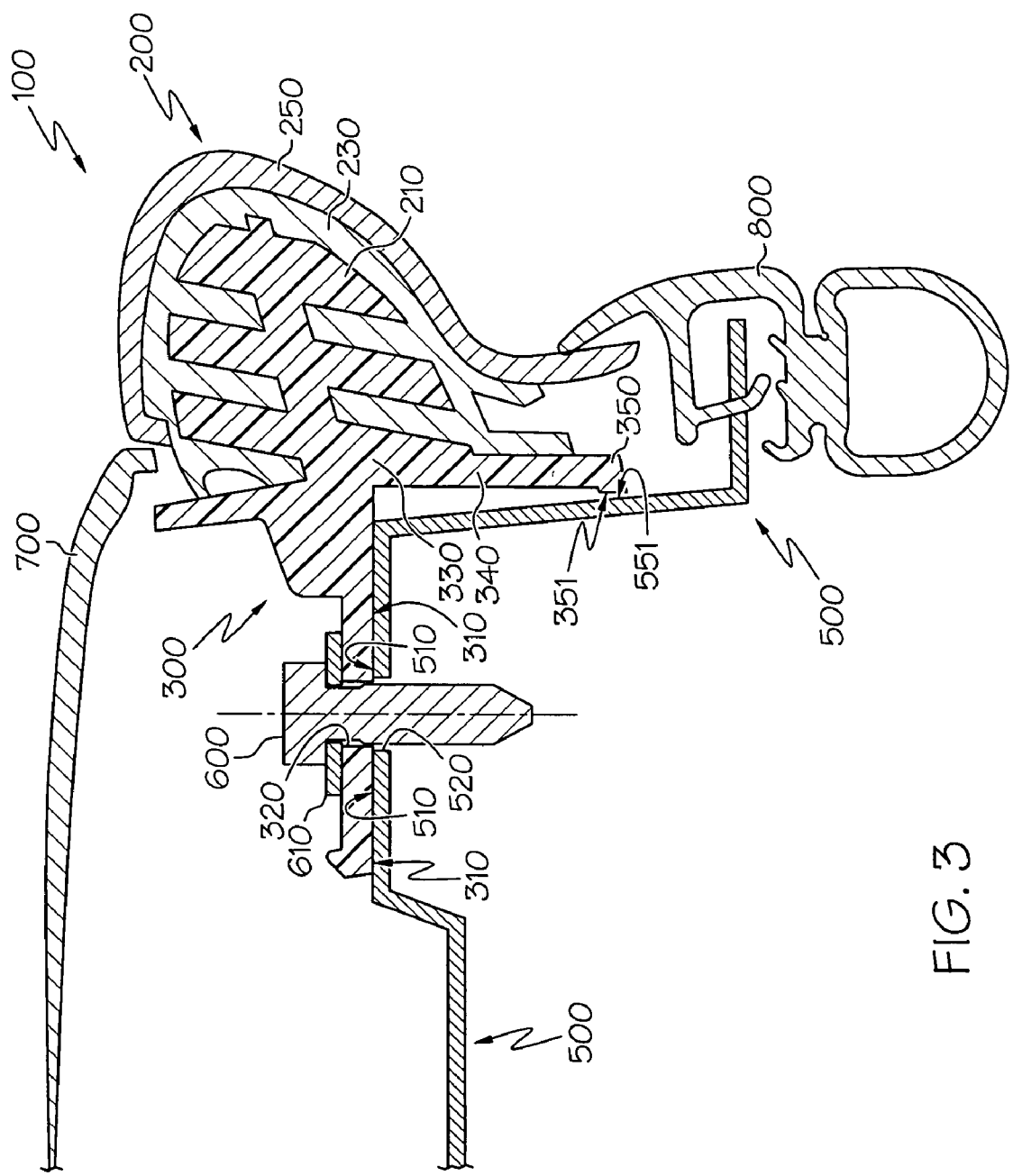
FIG. 3 is a cross-sectional view of the assist grip assembly of FIGS. 1 and 2, taken along line A-A of FIG. 2, showing an exemplary embodiment of a support structure.
Figure 4:
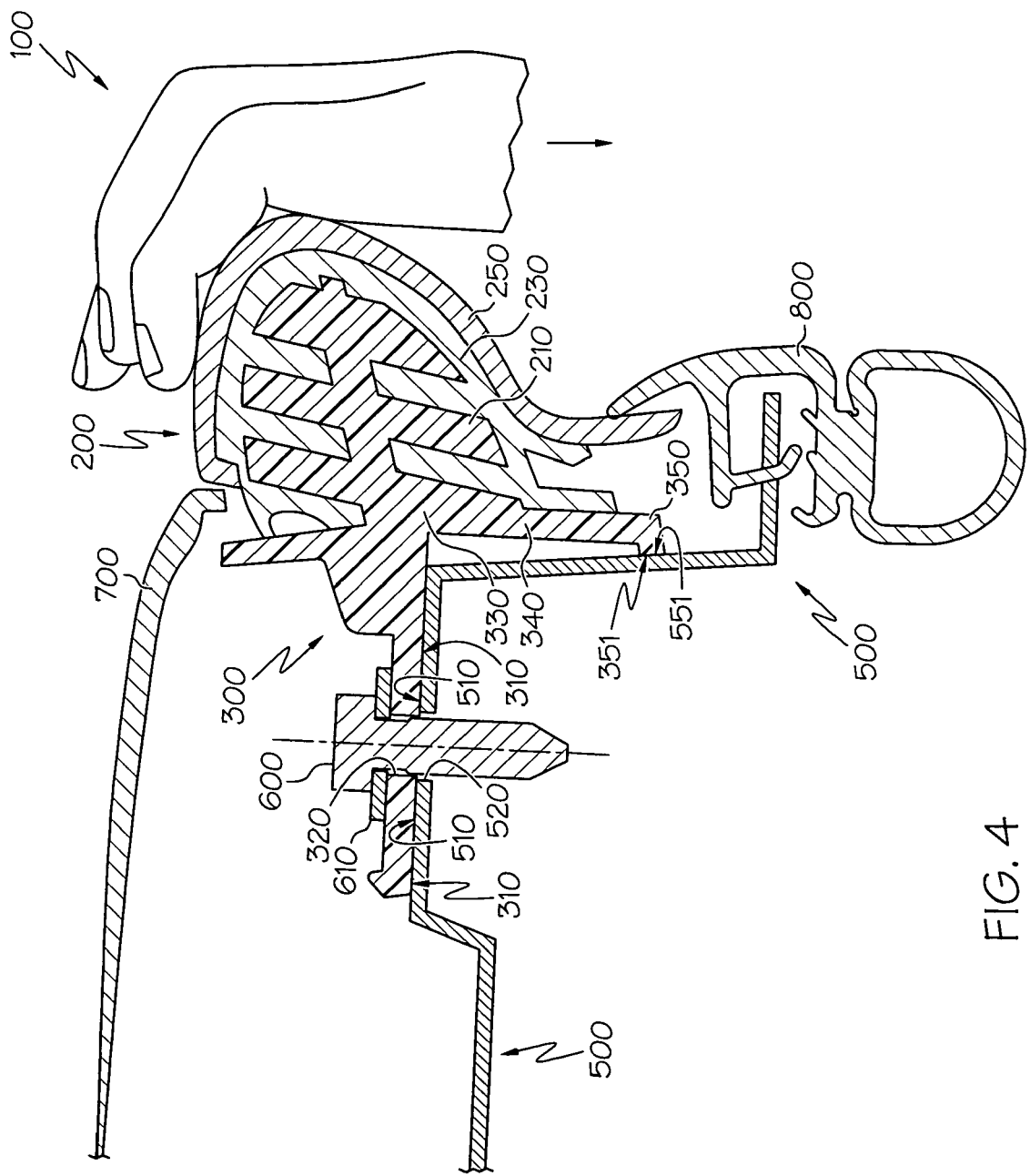
FIG. 4 is the embodiment of FIG. 3, further depicting a hand pulling the assist grip assembly in a first direction.
Figure 5:
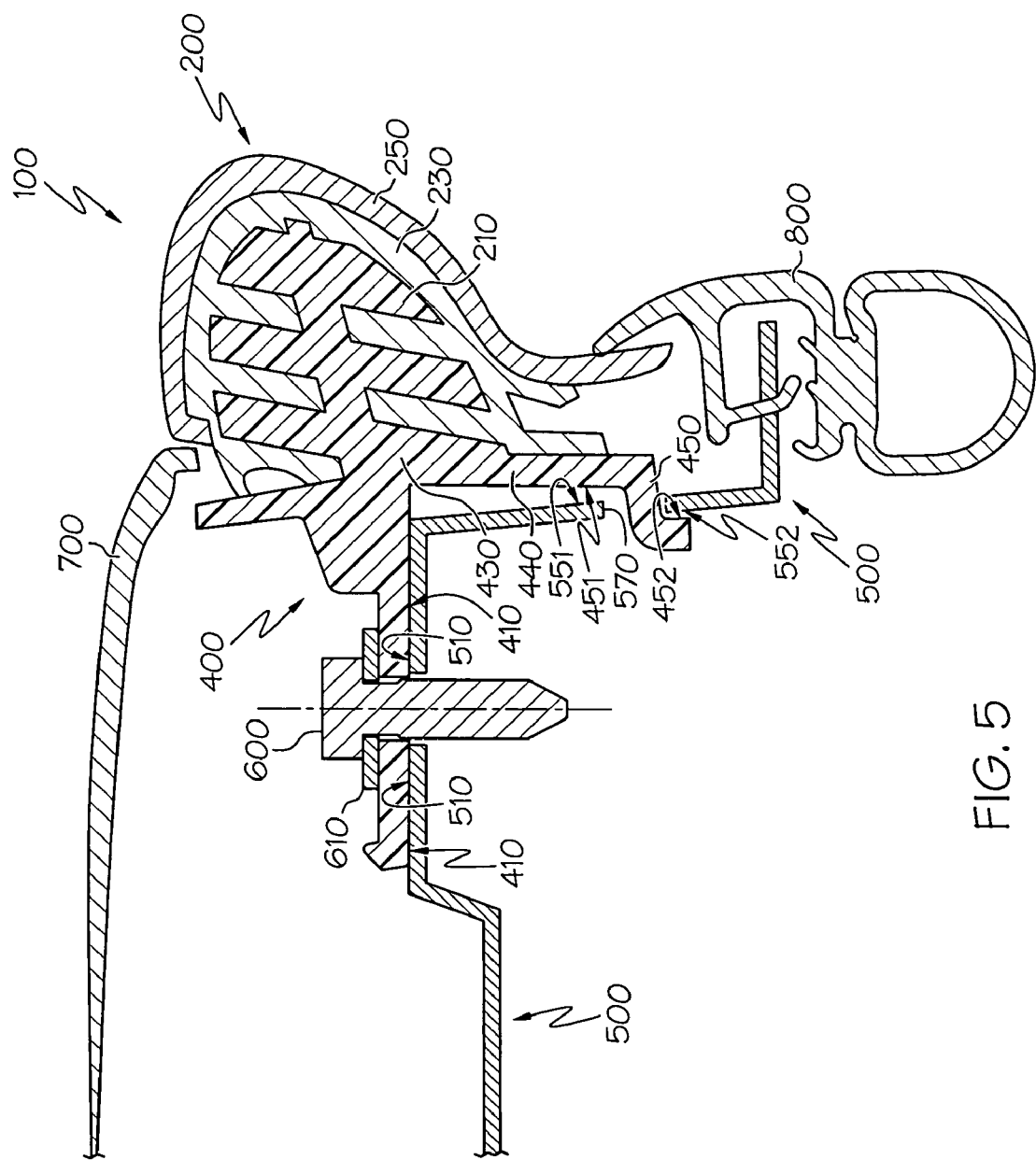
FIG. 5 is a cross-sectional view of the assist grip assembly of FIGS. 1 and 2, taken along line A-A of FIG. 2, showing another exemplary embodiment of a support structure.
Figure 6:
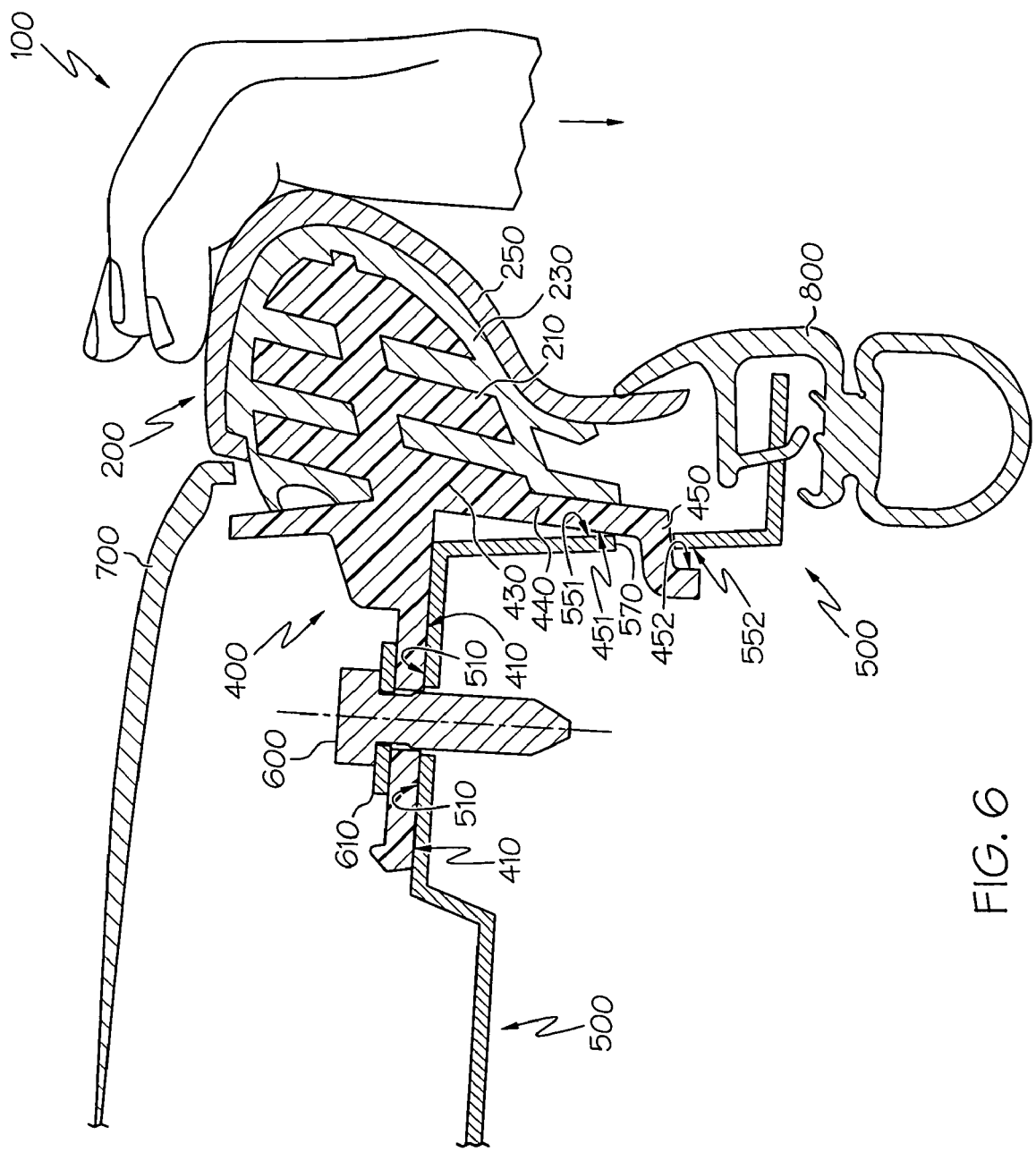
FIG. 6 is the embodiment of FIG. 5, further depicting a hand pulling the assist grip assembly in a first direction.
Figure 7:
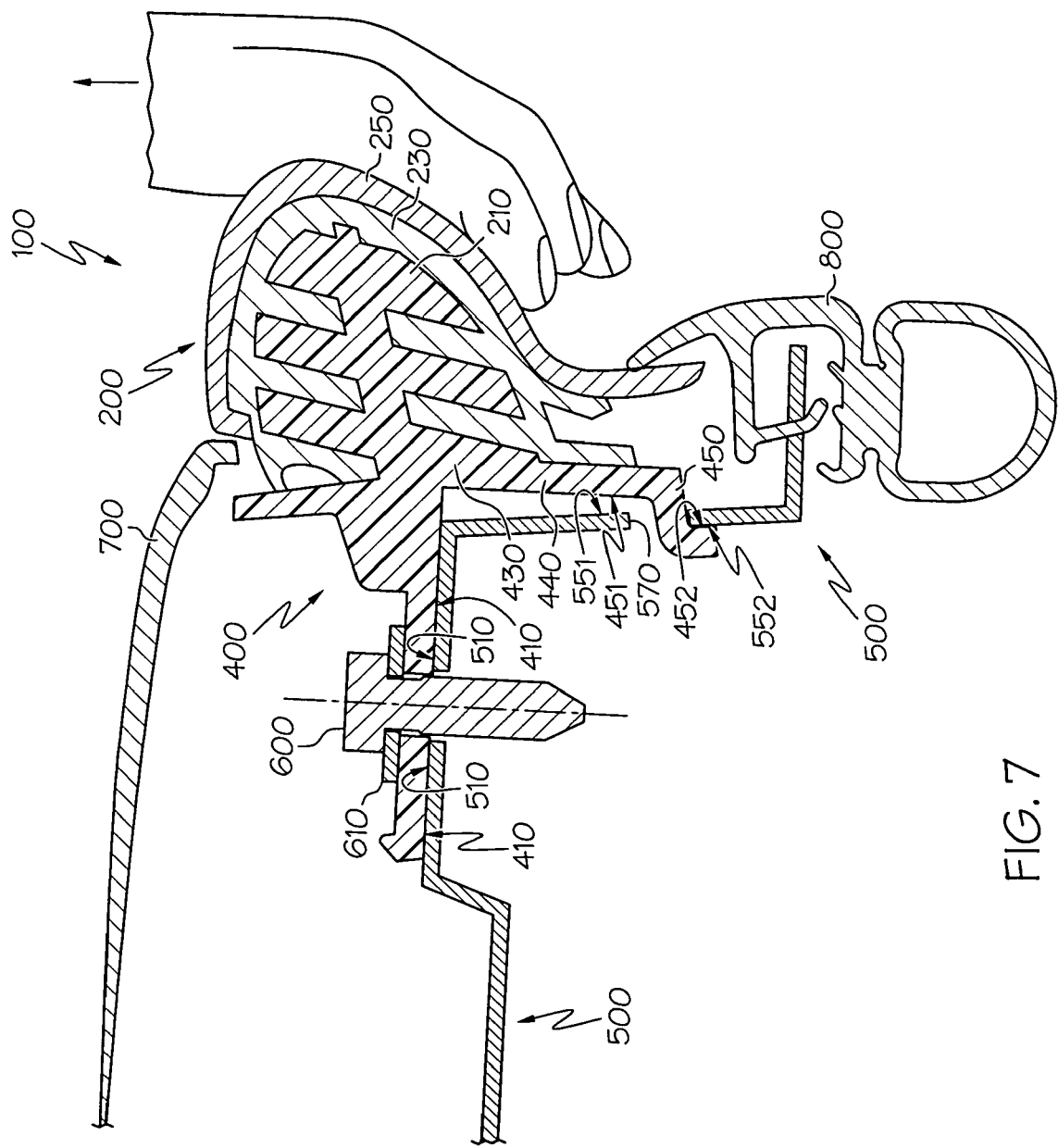
FIG. 7 is the embodiment of FIG. 5, further depicting a hand pulling the assist grip assembly in a second direction.

As depicted in FIGS. 1-7, assist grip assembly 100 may include a handle portion 200 and at least one support structure 300,400. FIGS. 1 and 2 depict the exterior of assist grip assembly 100, and FIGS. 3-7 depict cross-sectional views of the assist grip assembly (taken along line A-A of FIG. 2) that illustrate embodiments of support structure 300,400. Consequently, FIGS. 1 and 2 only illustrate the exterior surface of handle portion 200, while the support structures are hidden from view. On the other hand, FIGS. 3-7 depict the configuration of embodiments of support structure 300,400, as well as the internal structure of handle portion 200 (FIGS. 3 and 4 illustrating a first embodiment of a support structure 300 and FIGS. 5-7 illustrating a second embodiment of a support structure 400). Although the figures only illustrate one style of assist grip assembly, embodiments of assist grip assembly 100 may take any size, shape or configuration known in the assist grip art. Moreover, although the figures depict assist grip assembly 100 with a single handle portion 200 and two points of attachment 101 with the vehicle (and therefore two support structures), embodiments of the assist grip assembly may include any number of points of attachment and any number of support structures.

FIG. 3 illustrates assist grip assembly 100 that comprises a first exemplary embodiment of support structure 300. Support structure 300 may include securing surface 310 and transfer member 330, which may be attached to each other or integrally formed together. Support structure 300 may be constructed of any material know in the art, including, but not limited to, steel, iron, aluminum, fiberglass, polymers, plastics and the like. The illustrated embodiment of support structure 300 is constructed as one piece of high strength plastic.

Securing surface 310 may be shaped for attachment to the sheet metal of the vehicle body 500 at a mounting area 510. Both securing surface 310 and mounting area 510 of the illustrated embodiment of FIG. 3 are flat, but any interface between these two surfaces that allows for attachment may be utilized. Securing surface 310 and mounting area 510 may be connected through any method known in the art. For example, as illustrated, securing surface 310 may include an aperture 320 and mounting area 510 may include an aperture 520 for application of a fastener 600. When apertures 320,520 are aligned, fastener 600 (a bolt with washer 610 in the illustrated embodiment of FIG. 3) may be utilized to affix securing surface 310 to mounting area 510. However, embodiments of support structure 300 need not have securing surface 310 and mounting area 510 that include apertures, as the fastener(s) of some embodiments may not necessitate such apertures. Further, some embodiments of assist grip assembly 100 need not utilize fasteners, as securing surface 310 may be affixed to mounting area 510 through welding, soldering or adhesives.

Transfer member 330 may be configured in various shapes, sizes and configurations and may comprise flex member 340 and contact portion 350. The width of transfer member 330 (in the direction perpendicular to the line A-A in FIG. 2) depends on the requirements of the particular application, but may be anywhere from an eighth of an inch to six inches. The particular embodiment of FIG. 3 depicts a transfer member 330 that includes an "L" shaped structure. The vertical element of the "L" comprises flex member 340 and the horizontal element comprises contact portion 350. However, embodiments of support structure 300 need not include an "L" shaped transfer member 330, as other shapes and configurations will suffice. For example, an embodiment of support structure 300 may include transfer member 330 that includes a vertical structure with no horizontal element. In such an embodiment, flex member 340 would comprise the majority of the vertical structure, and contact portion 350 would comprise the distal end of the vertical structure. As will be further described in detail below, contact portion 350 includes contact surface 351 that rests against contact area 551 of vehicle body 500 when a load is applied to handle portion 200. When there is no load applied to handle portion 200, contact surface 351 does not touch contact area 551 of vehicle body 500. Such an orientation of assist grip assembly 100 is herein defined as the unsupported position, and is illustrated in FIG. 3. When a load is applied to handle portion 200, contact surface 351 touches contact area 551 of vehicle body 500. Such an orientation of assist grip assembly 100 is herein defined as the supported position, and is illustrated in FIG. 4.

Referring back to FIG. 3, handle portion 200 may comprise a spine 210, a primary overlay 230 and a secondary overlay 250. Spine 210 of handle portion 200 may be connected to, or integrally formed with, support structure 300. Spine 210 provides stability to handle portion 200 and may be constructed of any material know in the art, including, but not limited to, steel, iron, aluminum, fiberglass, polymers, plastics and the like. The illustrated embodiment of assist grip assembly 100 comprises spine 210 that is integrally formed with support structure(s) 300 and constructed of one piece of high strength plastic. Because assist grip assembly 100 may include two support structures 300 (one at each point of attachment 101, as shown in FIGS. 1 and 2), spine 210 may run the length of handle portion 200 and connect to, or be integrally formed with, both support structures. Spine 210 of the illustrated embodiment comprises a fluted construction, although any construction known in the art may be utilized. Spine 210 may be covered with primary overlay 230. Primary overlay 230 may be covered with secondary overlay 250. Primary overlay 230 and secondary overlay 250 soften the feel of assist grip assembly 100 and may be constructed of any material know in the art, including, but not limited to, polymers, plastics, leather, natural and synthetic materials and the like. Moreover, primary overlay 230 and secondary overlay 250 need not be included on assist grip assembly 100. In such embodiments, handle portion 200 may solely comprise spine 210.

Depending on the location of assist grip assembly 100, other trim pieces may be located on or around the assist grip assembly. The illustrated embodiment of assist grip assembly 100 includes a trim covering 700 that mounts over the door jam post that spans the length between the dashboard and the roof of a vehicle. The illustrated embodiment also includes a sealing assembly 800 that spans the length of the door jam. Alternate trim pieces may be utilized depending on the location of the assist grip assembly on or within the vehicle.

FIG. 4 illustrates the assist grip assembly of FIG. 3 when a user applies a load (e.g., pulls, pushes and/or rotates) to handle portion 200 in a downward direction. Depending on the location of assist grip assembly 100 on or within the vehicle, this illustrated downward force may be equivalent to the force exerted by a user on handle portion 200 when entering or exiting the vehicle. This illustrated downward force is defined as a load applied in a first direction. When the load is applied in the first direction, flex portion 340 may flex enough to allow contact surface 351 of contact portion 350 to touch contact area 551 of vehicle body 500. As described before, when contact surface 351 touches contact area 551 of vehicle body 500, assist grip assembly 100 is in a supported position. The contact between contact surface 351 and contact area 551 allows for the transfer of at least a portion of the user-applied load away from the point of attachment between assist grip assembly 100 and vehicle body 500. In the illustrated embodiment, this point of attachment is the location where mounting area 510 of vehicle body 500 is secured to securing surface 310 by fastener 600. Essentially, the contact between contact surface 351 and contact area 551 provides an additional location to transfer the load asserted in the first direction from the assist grip assembly to the sheet metal of the vehicle body. As a result, the load will be divided between mounting area 510 and contact area 551 of vehicle body 500. Because the division of the load reduces the load borne by mounting area 510, the durability and strength of the point(s) of attachment of the assist grip assembly is increased.

FIG. 5 illustrates assist grip assembly 100 that comprises a second exemplary embodiment of support structure 400. The assist grip assembly of FIG. 5 is similar to the assist grip assembly of FIGS. 3 and 4 in most respects, with the exception of the contact portion 450 of the transfer member 430. In addition, the sheet metal of vehicle body 500 may include an aperture 570 for the passing through of contact portion 450. Referring to FIG. 5, contact portion 450 may comprise an extension that extends from the "L" shaped portion of transfer member 430 that includes first contact surface 451 and second contact surface 452. The extension of contact portion 450 may insert into aperture 570 to hook in the sheet metal of vehicle body 500. When hooked through aperture 570, first contact surface 451 faces first contact area 551 of vehicle body 500 and second contact surface 452 faces second contact area 552 of vehicle body 500. When first contact surface 451 is free from first contact area 551 of vehicle body 500 and second contact surface 452 is free from second contact area 552, the assist grip assembly is in an unsupported position.

FIG. 6 illustrates the assist grip assembly of FIG. 5 when a user applies a load (e.g., pulls, pushes and/or rotates) to handle portion 200 in a downward direction. As before, depending on the location of the assist grip assembly on or within the vehicle, this illustrated downward force may be equivalent to the force exerted by a user on handle portion 200 when entering or exiting the vehicle. Again, this illustrated downward force is defined as a load applied in a first direction. When such load is applied in the first direction, flex portion 440 may flex enough to allow first contact surface 451 to touch first contact area 551 of vehicle body 500. When first contact surface 451 touches first contact area 551 of vehicle body 500, the assist grip assembly is in a first supported position. The contact between first contact surface 451 and first contact area 551 allows for the transfer of at least a portion of the user-applied load away from the point of attachment between assist grip assembly 100 and vehicle body 500. In the illustrated embodiment, this point of attachment is the location where mounting area 510 of vehicle body 500 is secured to securing surface 410 by fastener 600. Essentially, the contact between first contact surface 451 and first contact area 551 provides an additional surface to transfer the load in the first direction from the assist grip assembly to the sheet metal of the vehicle body. As a result, the load will be divided between mounting area 510 and first contact area 551 of vehicle body 500. Because the division of the load reduces the load borne by mounting area 510, the durability and strength of the point(s) of attachment of the assist grip assembly is increased.

FIG. 7 illustrates the assist grip assembly of FIG. 5 when a user applies a load (e.g., pulls, pushes and/or rotates) to handle portion 200 in a upward direction. Depending on the location of the assist grip assembly on or within the vehicle, this illustrated upward force may be equivalent to the force exerted by a user on handle portion 200 when entering or exiting the vehicle. This illustrated upward force is defined as a load applied in a second direction. When the load is applied in the second direction, flex portion 440 may flex enough to allow second contact surface 452 to touch second contact area 552 of vehicle body 500. When second contact surface 452 touches second contact area 552 of vehicle body 500, the assist grip assembly is in a second supported position. The contact between second contact surface 452 and second contact area 552 allows for the transfer of at least a portion of the user-applied load away from the point of attachment between assist grip assembly 100 and vehicle body 500. In the illustrated embodiment, this point of attachment is the location where mounting area 510 of vehicle body 500 is secured to securing surface 410 by fastener 600. Essentially, the contact between second contact surface 452 and second contact area 552 provides an additional surface to transfer the load in the second direction from the assist grip assembly to the sheet metal of the vehicle body. As a result, the load will be divided between mounting area 510 and second contact area 552 of vehicle body 500. Because the division of the load reduces the load borne by mounting area 510, the durability and strength of the point(s) of attachment of the assist grip assembly is increased.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. An assist grip assembly comprising a handle portion and at least one support structure, the at least one support structure comprising:

a securing surface attached to a mounting area of a vehicle body, and a transfer member comprising a flex portion and a contact portion having a contact surface;

wherein the transfer member is formed with or attached to the handle portion;

wherein when a downward force is applied to the handle portion, the contact surface of the transfer member contacts a contact area of the vehicle body and transfers at least a portion of the load from the mounting area to the contact area; and wherein when the downward force is not applied to the handle portion, the contact surface of the transfer member is free from contact with the contact area of the vehicle body.

2. The assist grip assembly support structure of claim 1, wherein the transfer member comprises an "L" shaped structure.

3. The assist grip assembly support structure of claim 1, wherein the securing surface is attached to the mounting area of the vehicle body by a fastener.

4. The assist grip assembly support structure of claim 3, wherein the fastener comprises a bolt.

5. The assist grip assembly support structure of claim 1, wherein the handle portion comprises a spine.

6. An assist grip assembly comprising a handle portion and at least one support structure, the at least one support structure comprising:

a securing surface attached to a mounting area of a vehicle body, and a transfer member comprising a flex portion and a contact portion having a first contact surface and a second contact surface;

wherein the transfer member is formed with or attached to the handle portion;

wherein when the contact portion is inserted into an aperture in the vehicle body, the first contact surface faces a first contact area of the vehicle body and the second contact surface faces a second contact area of the vehicle body; and wherein when a downward force is applied to the handle portion, the assist grip assembly is in a first supported position, the first contact surface of the transfer member contacts the first contact area of the vehicle body and transfers at least a portion of a load from the mounting area to the first contact area, and when an upward force is applied to the handle portion, the assist grip assembly is in a second supported position, the second contact surface of the transfer member contacts the second contact area of the vehicle body and transfers at least a portion of a load from the mounting area to the second contact area.

7. The assist grip assembly of claim 6, wherein when the assist grip assembly is in an unsupported position, the first contact surface of the transfer member is free from contact with the first contact area of the vehicle body and the second contact surface of the transfer member is free from contact with the second contact area of the vehicle body.

8. The assist grip assembly support structure of claim 6, wherein the transfer member comprises an "L" shaped structure that includes an extension from a horizontal element of the "L" shaped structure.

9. The assist grip assembly support structure of claim 6, wherein the securing surface is attached to the mounting area of the vehicle body by a fastener.

10. The assist grip assembly support structure of claim 9, wherein the fastener comprises a bolt.

11. The assist grip assembly support structure of claim 6, wherein the handle portion comprises a spine.

12. The assist grip assembly support structure of claim 11, wherein the handle portion further comprises a primary overlay that covers the spine.

13. An assist grip assembly comprising a handle portion and at least one support structure comprising, the at least one support structure comprising:
a securing surface attached to a mounting area of a vehicle body, and a transfer member comprising a flex portion and a contact portion having a contact surface;
wherein the transfer member is formed with or attached to the handle portion;
wherein when no force is applied to the handle portion, the assist grip assembly is in an unsupported position such that the contact surface of the transfer member is free from contact with a contact area of the vehicle body; and
wherein when a downward force is applied to the handle portion, the assist grip assembly is in a supported position such that the contact surface of the transfer member contacts the contact area of the vehicle body and transfers at least a portion of the load from the mounting area to the contact area.

14. The assist grip assembly of claim 13, comprising two support structures.

15. The assist grip assembly of claim 14, wherein the securing surfaces are attached to the mounting areas of the vehicle body by fasteners.

16. The assist grip assembly of claim 15, wherein the fasteners comprise bolts.

17. The assist grip assembly of claim 16, wherein the assist grip assembly is located an interior of a vehicle adjacent an exit.

18. The assist grip assembly of claim 17, wherein the assist grip assembly is located a post that spans the length between the dashboard and the roof of a vehicle.

19. The assist grip assembly of claim 13, wherein the transfer member comprises an "L" shaped structure.

* * * * *